(12) United States Patent
Mazor

(10) Patent No.: US 7,746,989 B2
(45) Date of Patent: Jun. 29, 2010

(54) SYSTEM AND METHOD FOR RECORDING AND ATTACHING AN AUDIO FILE TO AN ELECTRONIC MESSAGE GENERATED BY A PORTABLE CLIENT DEVICE

(75) Inventor: Gadi Mazor, Ramat Efal (IL)

(73) Assignee: Onset Technology, Ltd., Hertzelia (IL)

( * ) Notice: Subject to any disclaimer, the term of this patent is extended or adjusted under 35 U.S.C. 154(b) by 1114 days.

(21) Appl. No.: 11/401,362

(22) Filed: Apr. 11, 2006

(65) Prior Publication Data

US 2006/0256934 A1 Nov. 16, 2006

Related U.S. Application Data

(60) Provisional application No. 60/670,234, filed on Apr. 12, 2005.

(51) Int. Cl.
*H04M 11/06* (2006.01)

(52) U.S. Cl. .............. 379/88.13; 379/88.01; 379/88.17; 382/181; 382/299; 455/3.06; 700/94; 704/260; 709/206

(58) Field of Classification Search ................. 379/67.1, 379/68, 88.17, 88.01, 88.13; 709/206–207; 382/181, 299; 455/3.06; 700/94; 704/260
See application file for complete search history.

(56) References Cited

U.S. PATENT DOCUMENTS

| | | | |
|---|---|---|---|
| 4,996,707 A | 2/1991 | O'Malley et al. | |
| 5,127,047 A | 6/1992 | Bell et al. | |
| 5,247,591 A | 9/1993 | Baran | |
| RE34,429 E | 11/1993 | Baran et al. | |
| 5,287,199 A | 2/1994 | Zoccolillo | |
| 5,557,659 A * | 9/1996 | Hyde-Thomson | ........ 379/88.13 |
| 5,647,002 A | 7/1997 | Brunson | |
| 5,742,905 A | 4/1998 | Pepe et al. | |
| 5,758,088 A | 5/1998 | Bezaire et al. | |
| 5,767,985 A | 6/1998 | Yamamoto et al. | |
| 5,903,723 A | 5/1999 | Beck et al. | |
| 5,903,833 A | 5/1999 | Jonsson et al. | |
| 5,948,059 A * | 9/1999 | Woo et al. | ................... 709/206 |
| 6,091,947 A | 7/2000 | Sumner | |
| 6,104,500 A | 8/2000 | Alam et al. | |
| 6,157,706 A | 12/2000 | Rachelson | |
| 6,185,604 B1 | 2/2001 | Sekiguchi | |
| 6,211,972 B1 | 4/2001 | Okutomi et al. | |
| 6,219,694 B1 | 4/2001 | Lazaridis et al. | |
| 6,233,430 B1 | 5/2001 | Helferich | |
| 6,246,983 B1 * | 6/2001 | Zou et al. | ................... 704/260 |
| 6,259,533 B1 | 7/2001 | Toyoda et al. | |
| 6,360,252 B1 | 3/2002 | Rudy et al. | |
| 6,385,306 B1 * | 5/2002 | Baxter, Jr. | ................ 379/88.13 |
| 6,697,458 B1 | 2/2004 | Kunjibettu | |

(Continued)

FOREIGN PATENT DOCUMENTS

EP 0 465 011 1/1992

*Primary Examiner*—Gerald Gauthier
(74) *Attorney, Agent, or Firm*—Pillsbury Winthrop Shaw Pittman LLP

(57) ABSTRACT

A system and method for recording and attaching an audio file to an electronic message generated by a portable client device. In some embodiments, the audio file may be recorded remotely from the portable client device, and may be attached to the electronic message at an enterprise server while being transmitted from the portable client device to an intended recipient.

18 Claims, 5 Drawing Sheets

U.S. PATENT DOCUMENTS

| | | |
|---|---|---|
| 6,771,949 B1 | 8/2004 | Corliss |
| 6,865,680 B1 | 3/2005 | Wu et al. |
| 7,003,304 B1 | 2/2006 | Helferich |
| 7,286,650 B2 * | 10/2007 | Pantana et al. ............ 379/88.13 |
| 7,596,285 B2 * | 9/2009 | Brown et al. ................. 382/299 |
| 2001/0019951 A1 | 9/2001 | Haumont et al. |
| 2002/0194279 A1 * | 12/2002 | Chern ......................... 709/206 |
| 2003/0072488 A1 * | 4/2003 | Barsness et al. ............. 382/181 |
| 2003/0099341 A1 | 5/2003 | Williams |
| 2003/0140146 A1 | 7/2003 | Akers et al. |
| 2003/0190887 A1 | 10/2003 | Hook et al. |
| 2003/0200264 A1 | 10/2003 | Brill |
| 2004/0105536 A1 | 6/2004 | Williams |
| 2004/0148357 A1 | 7/2004 | Corrigan et al. |
| 2005/0076082 A1 * | 4/2005 | Le Pennec et al. .......... 709/206 |
| 2005/0245239 A1 | 11/2005 | Haumont et al. |
| 2007/0149115 A1 * | 6/2007 | White et al. ................ 455/3.06 |
| 2009/0248182 A1 * | 10/2009 | Logan et al. .................. 700/94 |

* cited by examiner

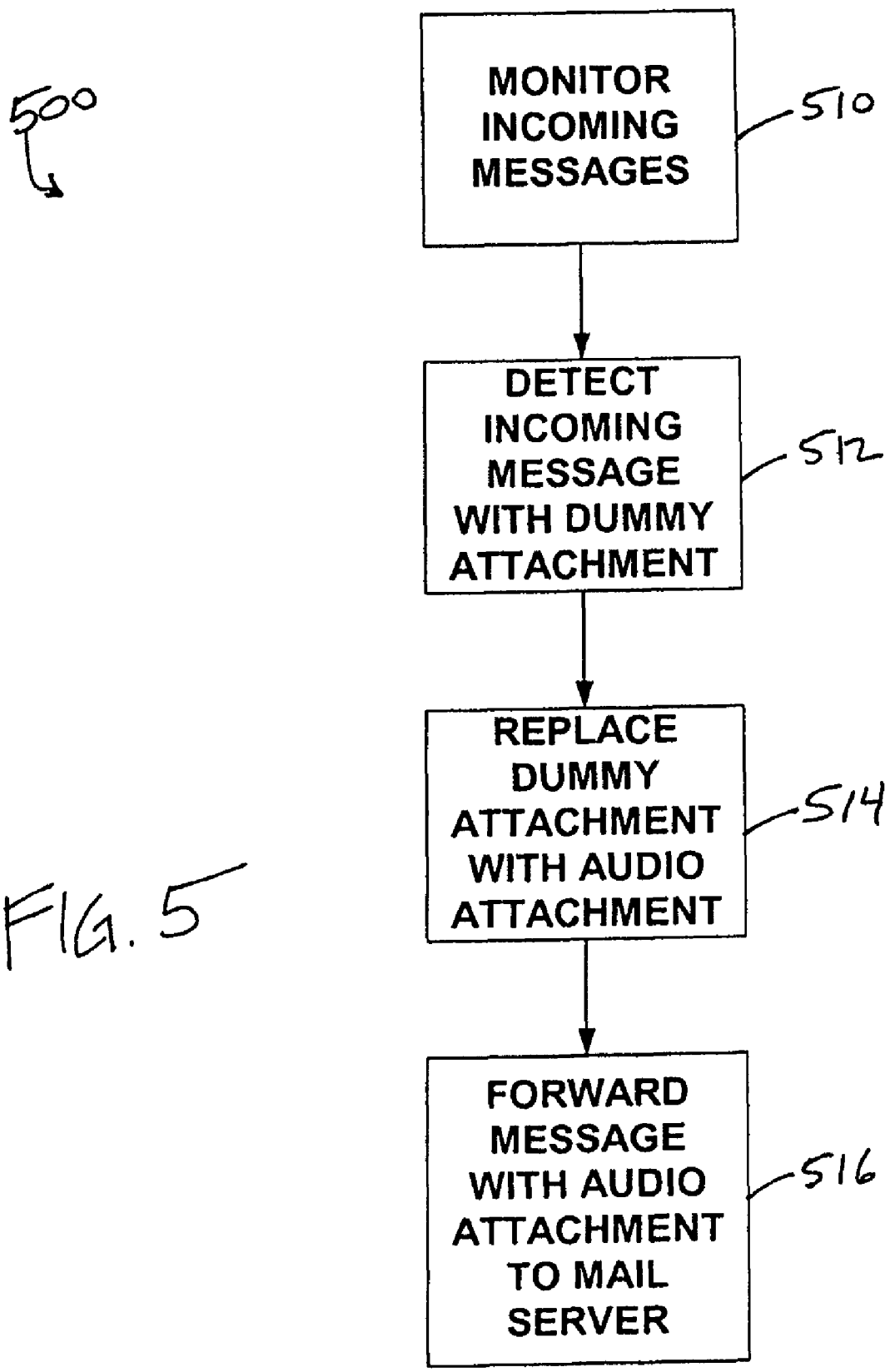

SYSTEM AND METHOD FOR RECORDING AND ATTACHING AN AUDIO FILE TO AN ELECTRONIC MESSAGE GENERATED BY A PORTABLE CLIENT DEVICE

RELATED APPLICATIONS

This application claims priority from U.S. Provisional Patent Application No. 60/670,234, filed Apr. 12, 2005, and entitled "System and Method for Recording and Attaching an Audio File to an Electronic Message Generated by a Portable Client Device," the contents of which are incorporated herein by reference.

This application is related to U.S. Provisional Patent Application No. 60/534,965, filed Jan. 9, 2004, and entitled "System and Method for Enabling a Wireless Terminal Device to Interact with a Voice Mail System via a Data Communications Network;" and U.S. patent application Ser. No. 11/030,894, filed Jan. 10, 2005, and entitled "System and Method for Enabling a Wireless Terminal Device to Interact with a Voice Mail System via a Data Communications Network;" the contents of both of these applications are incorporated herein by reference.

FIELD OF THE INVENTION

The invention relates to recording and attaching audio files to electronic messages generated by portable client devices.

BACKGROUND OF THE INVENTION

Handheld devices are commonly used for communications. For example, devices such as the Blackberry are used to provide wireless email communication. Because these devices are small, the amount of resources available to the device may be limited. For example, a user may not be able to record and/or attach an audio file to emails sent from a conventional device. Recording and attaching an audio file may enable a user to, for example, compose a new email that included primarily audio content, may enable a reply to a received email in instances when the user is not able, or does not wish to, type out a response, may enable dictation of a letter to be transmitted from a handheld device, or may provide other functionalities.

Conventional handheld devices may not be suitable for recording, storing, and/or attaching audio files for a variety of reasons. For example, a device in many cases does not have a sound recorder, or a capability of storing a file that is the size of a typical audio file. Efforts to compress audio files may be frustrated by the number of CPU cycles required for compression, which may monopolize a processor associated with the device and may drain the device's local power source (e.g., battery). Even if an audio file were recorded and stored a conventional device, the limitation of known wireless connections typically implemented in handheld data communications, such as General Packet Radio Service (GPRS), may make transmitting files the size of typical audio files slow and expensive.

Other drawbacks also exist.

SUMMARY

One aspect of various embodiments of the invention may relate to a system and method for recording and attaching an audio file to an electronic message generated by a portable client device. In some embodiments, the audio file may be recorded remotely from the portable client device, and may be attached to the electronic message at an enterprise server while being transmitted from the portable client device to an intended recipient.

According to various embodiments of the invention, a system may include a portable client device connected to each of a gateway and an enterprise server via operative links. The client device may be operatively linked to the enterprise server by way of a wireless network to enable wireless data communication between the client device and the enterprise server. An enterprise server extension module may interface with enterprise server. The enterprise server may transmit and receive electronic messages (e.g., emails) to and from a mail server.

In some embodiments of the invention, a user may compose an electronic message on the client device. The electronic message may be a new message, a reply to a received message, or may be forwarding a received message. The user may record an audio file for attachment to the electronic message by opening an audio communication session between the gateway and the client device, and recording audio content at the gateway transmitted from the client device during the audio communication session. Upon completion of the audio communication session, a dummy file may be attached to the electronic message being composed on client device. The user may then transmit the electronic message and the attached dummy file to the enterprise server. The enterprise server extension module may detect the electronic message and dummy file attachment received at the enterprise server. Based on this detection, the dummy file may be replaced with the audio file recorded at the gateway, and the resulting electronic message and attached audio file may be transmitted to the mail server. The mail server may then forward the electronic message and attached audio file to an intended recipient.

In some embodiments of the invention, the client device may be a wireless handheld device, such as, for example, a Blackberry, a personal data assistant (PDA), a web-enabled mobile phone, Palm Pilot, and/or other wireless handheld device. The client device may include a message management module, an audio communications module, and a dummy attachment module.

According to various embodiments of the invention, the message management module may enable a variety of functions related to electronic messaging on the client device. For example, the message management module may enable the user to view messages, edit messages, send messages, receive messages, delete messages, compose messages, open messages, close messages, or other perform other functions with respect to electronic messages.

In some embodiments, the audio communications module may enable the client device to participate in audio communications sessions (e.g. phone calls) via typical wireless telecommunications technology (e.g., cellular, digital wireless). The audio communications module may include a speaker and a microphone at which the user may receive audio content and input audio content for transmission during audio communications sessions. The audio communications module may enable the user to selectably control audio communications sessions. For example, the audio communications module may include a numbered keypad, or other interface.

The dummy attachment module may create and attach a dummy file to an electronic message when an audio communication session between the client device and gateway, in which an audio file is recorded at the gateway, terminates. The dummy file created and attached by the dummy attachment module may include an indicator of its status as a dummy file, and, in some instances, the indicator may include an indication of the correlation between the dummy file and its corresponding audio file. The indicator may include, for example, a file format of the dummy file, a file name of the dummy file, or other indicators.

According to various embodiments of the invention, the gateway may include an audio recording module. The audio recording module may record audio files, re-record audio files, replay audio files, edit audio files, or perform other functions with respect to audio content transmitted to the audio recording module from the client device during an audio communications session between the client device and the gateway. In some instances, the audio recording module may be controlled automatically, or by controls selected by the user on the client device via the audio communications module. In a non-limiting example, at various points during an audio communications session, the user may be provided with a list of options, and may input a selection on a key pad associated with the audio communications module that corresponds to a desired one of the list of options.

In some embodiments of the invention, during an audio communication session initiated to record an audio file for attachment to an electronic message, an identifier associated with the electronic message may be transmitted from the client device to the gateway. The identifier may be provided automatically, and may be unique to the electronic message. The identifier may then be associated with the audio file recorded during the audio communication session, thereby effectively marking the audio file as being associated with the electronic message. In some instances, the identifier may include a caller identification of the client device determined automatically by the gateway.

In some embodiments, an audio file created by the audio recording module may be stored at the gateway until it is requested by the enterprise server based on the arrival of an electronic message that corresponds to the audio file at the enterprise server. Alternatively, the audio file may be stored remotely from the gateway. For example, the audio file may be stored at the enterprise server, or a storage module remote from the gateway.

In some embodiments, the enterprise server may be or include a Blackberry Enterprise Server or other server, a workstation running Palm Operating System, Windows NT, and/or other operating systems. The enterprise server may interface with an attachment management module. The attachment management module may be located locally at the enterprise server, at the gateway, or remotely from the enterprise server and the gateway. The attachment management module may replace a dummy file attached to an electronic message with an audio file that corresponds to the dummy file and electronic message so that the electronic message and the corresponding audio file may be forwarded to an intended recipient via the mail server. In embodiments in which the audio file is stored at the gateway, or at a storage module remotely situated from both the gateway and the attachment management module, the attachment management module may request the audio file when the enterprise server extension module detects that electronic message has been received at the enterprise server. In other embodiments, the audio file may be stored at the enterprise server. The attachment management module may replace the dummy file with the audio file by removing the dummy file from the electronic message and attaching the audio file in its place.

BRIEF DESCRIPTION OF THE DRAWINGS

FIG. 5 illustrates a flowchart describing a method for implementing various embodiments of the invention.

DETAILED DESCRIPTION

Figure 1:
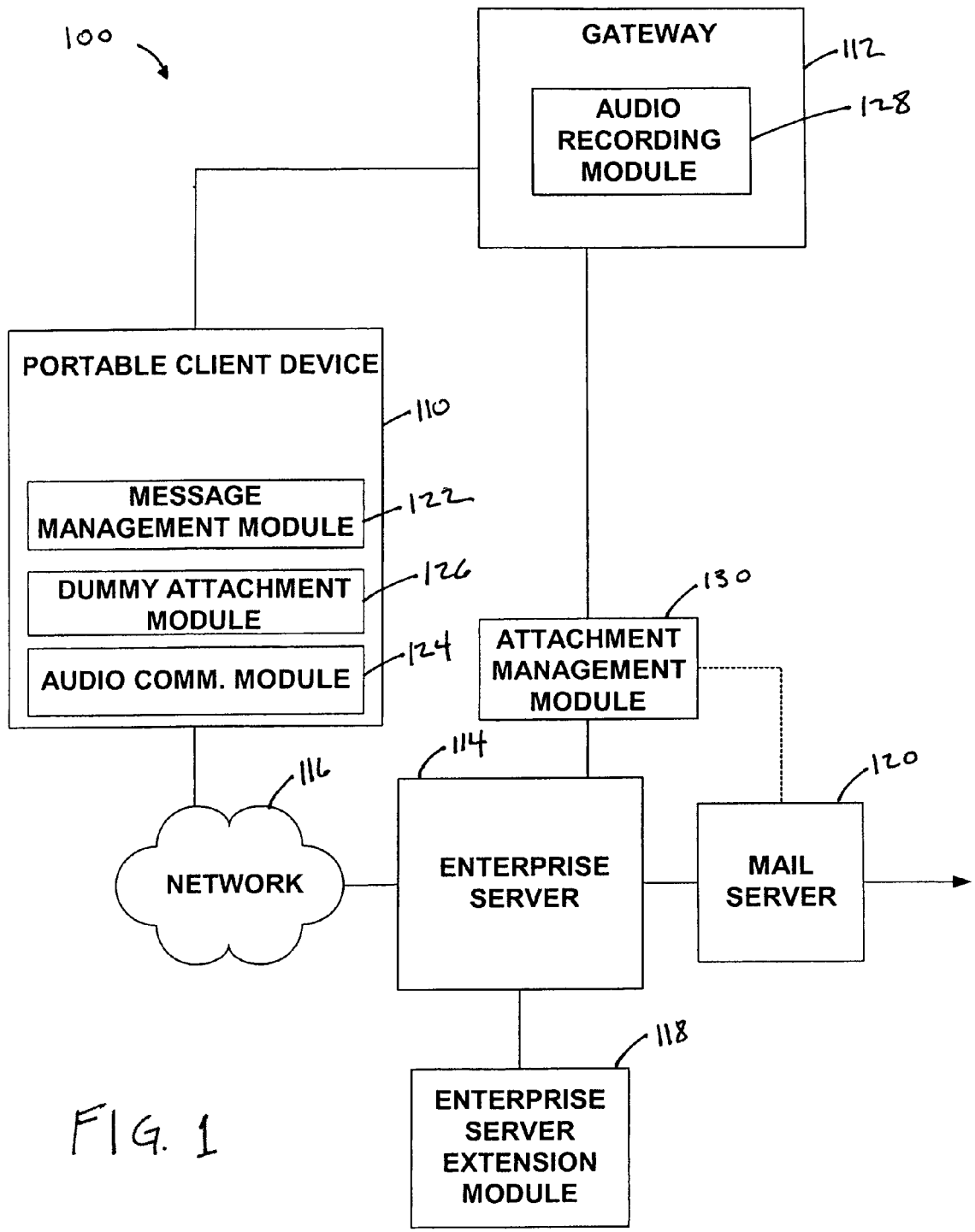
FIG. 1 illustrates a system diagram, in accordance with various embodiments of the invention.

FIG. 1 is an illustration of an overall system 100 implementing aspects of the invention. System 100 includes at least some or all of the following components. A portable client device 110 connected to each of a gateway 112 and an enterprise server 114 via operative links may be provided. Client device 110 may be operatively linked to enterprise server 114 by way of a wireless network 116 to enable wireless data communication between client device 110 and enterprise server 114. An enterprise server extension module 118 may interface with enterprise server 114, which may transmit and receive electronic messages (e.g., emails) to and from a mail server 120.

In some embodiments of the invention, a user may compose an electronic message on client device 110. The electronic message may be a new message, a reply to a received message, or may be forwarding a received message. The user may record an audio file for attachment to the electronic message by opening an audio communication session between gateway 112 and client device 110, and recording audio content at gateway 112 transmitted from client device 110 during the audio communication session. Upon completion of the audio communication session, a dummy file may be attached to the electronic message being composed on client device 110. The user may then transmit the electronic message and the attached dummy file to enterprise server 114. Enterprise server extension module 118 may detect the electronic message and dummy file attachment received at enterprise server 114. Based on this detection, enterprise server 114 may replace the dummy file with the audio file recorded at gateway 112, and transmit the resulting electronic message and attached audio file to mail server 120. Mail server 120 may then forward the electronic message and attached audio file to an intended recipient.

In some embodiments of the invention, the attachment of the dummy file may serve as a "flag" that identifies the electronic message so that the audio file may be attached subsequent to the transmission of the electronic message from client device 110 to enterprise server 114. In other embodiments, the electronic message may be flagged using an alternative flagging mechanism. For example, the electronic message may be flagged by inserting an alphanumeric string into a subject field of the electronic message, by inserting an alphanumeric string into a body of the electronic message, or via other flagging mechanisms. In embodiments implementing an alternative flagging mechanism, a dummy file may not be attached to the electronic message at all, or the dummy file may still be attached as a placeholder.

In some embodiments of the invention, client device 110 may be a wireless handheld device, such as, for example, a Blackberry, a personal data assistant (PDA), a web-enabled mobile phone, Palm Pilot, and/or other wireless handheld device. Client device 110 may include a message management module 122, an audio communications module 124, and a dummy attachment module 126.

According to various embodiments of the invention, message management module 122 may enable a variety of functions related to electronic messaging on client device 110. For example, message management module 122 may enable the user to view messages, edit messages, send messages, receive messages, delete messages, compose messages, open messages, close messages, or other perform other functions with respect to electronic messages.

In some embodiments, audio communications module 124 may enable client device 110 to participate in audio communications sessions (e.g. phone calls) via typical wireless telecommunications technology (e.g., cellular, digital wireless). Audio communications module 124 may include a speaker and a microphone at which the user may receive audio content and input audio content for transmission during audio communications sessions. Audio communications module 124 may enable the user to selectably control audio communications sessions. For example, audio communications module 124 may include a numbered keypad, or other interface.

Dummy attachment module 126 may create and attach a dummy file to an electronic message (and/or otherwise flag the electronic message) when an audio communication session between client device 110 and gateway 112, in which an audio file is recorded at gateway 112, terminates. The dummy file created and attached by dummy attachment module 126 may include an indicator of its status as a dummy file, and, in some instances, the indicator may include an indication of the correlation between the dummy file and its corresponding audio file. The indicator may include, for example, a file format of the dummy file, a file name of the dummy file, or other indicators.

According to various embodiments of the invention, gateway 112 may include an audio recording module 128. Audio recording module 128 may record audio files, re-record audio files, replay audio files, edit audio files, or perform other functions with respect to audio content transmitted to audio recording module 128 from client device 110 during an audio communications session between client device 110 and gateway 112. In some instances, audio recording module 128 may be controlled automatically, or by controls selected by the user on client device 110 via audio communications module 124. In a non-limiting example, at various points during an audio communications session, the user may be provided with a list of options, and may input a selection on a key pad associated with audio communications module 124 that corresponds to a desired one of the list of options.

In some embodiments of the invention, during an audio communication session initiated to record an audio file for attachment to an electronic message, an identifier associated with the electronic message may be transmitted from client device 110 to gateway 112. The identifier may be provided automatically, and may be unique to the electronic message. The identifier may then be associated with the audio file recorded during the audio communication session, thereby effectively marking the audio file as being associated with the electronic message. In some instances, the identifier may include a caller identification of client device 110 determined automatically by gateway 112.

In some embodiments, an audio file created by audio recording module 128 may be stored at gateway 112 until it is requested by enterprise server 114 based on the arrival of an electronic message that corresponds to the audio file at enterprise server 114. Alternatively, the audio file may be stored remotely from gateway 112. For example, the audio file may be stored at enterprise server 114, or a storage module remote from gateway 112.

In some embodiments, enterprise server 114 may be or include a Blackberry Enterprise Server or other server, a workstation running Palm Operating System, Windows NT, and/or other operating systems. Enterprise server 114 may interface with an attachment management module 130. Attachment management module 130 may be located locally at enterprise server 114, at gateway 112, or remotely from enterprise server 114 and gateway 112. Attachment management module 130 may replace a dummy file attached to an electronic message with an audio file that corresponds to the dummy file and electronic message so that the electronic message and the corresponding audio file may be forwarded to an intended recipient via mail server 120. In embodiments in which the audio file is stored at gateway 112, or at a storage module remotely situated from both gateway 112 and enterprise server 114, attachment management module 130 may request the audio file when enterprise server extension module 118 detects that electronic message has been received at enterprise server 114. In other embodiments, the audio file may be stored at enterprise server 114. Attachment management module 130 may replace the dummy file with the audio file by removing the dummy file from the electronic message and attaching the audio file in its place.

Figure 2:
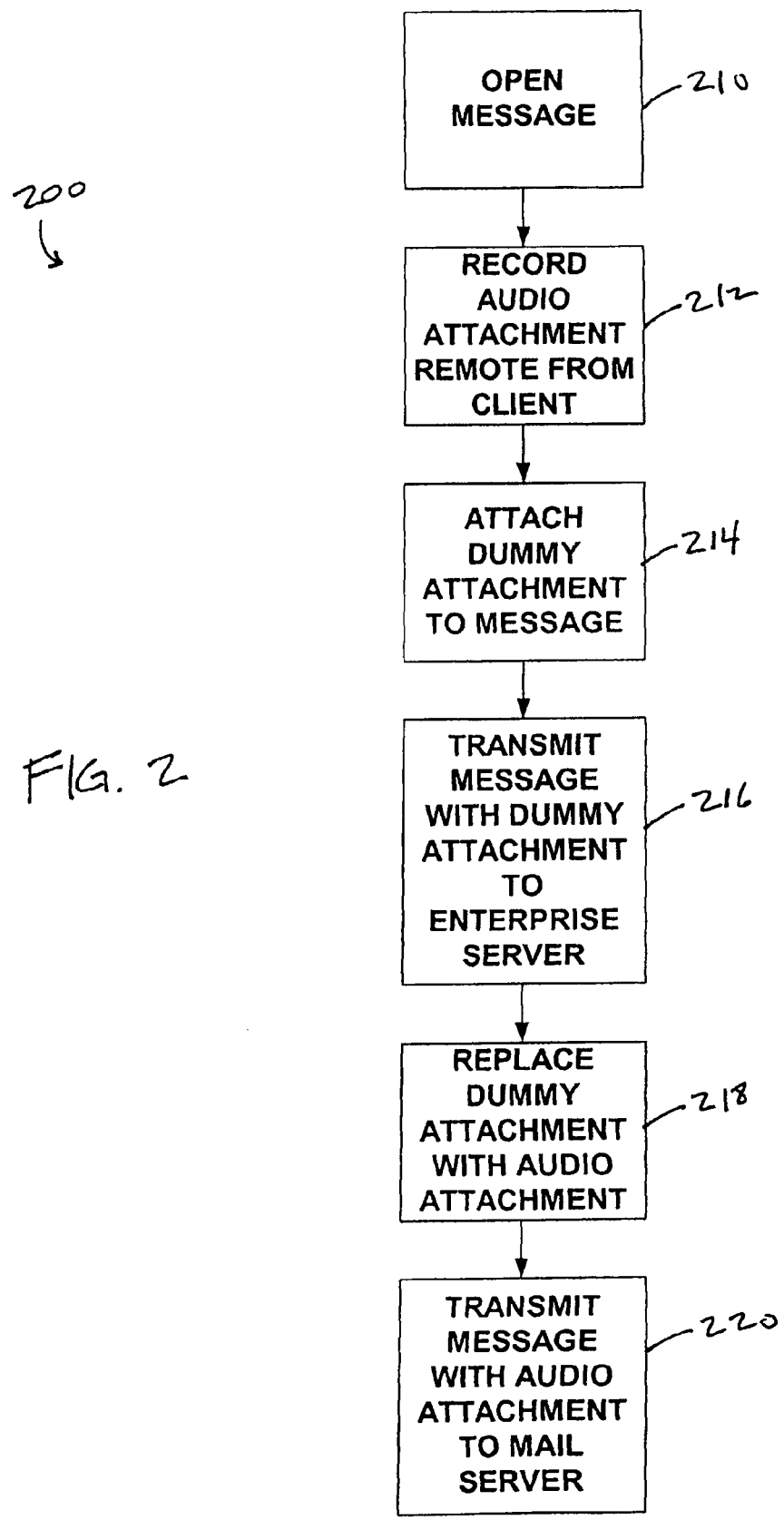
FIG. 2 illustrates a flowchart describing a method for implementing various embodiments of the invention.

FIG. 2 illustrates a method 200 for implementing various embodiments of the invention. At an operation 210, a user may open an electronic message. In some embodiments, operation 210 may include the user opening an electronic message on client device 110 via message management module 122. The message may include, for example, a new message, a reply message, a message to be forwarded, or other messages.

Method 200 may include an operation 212, at which the user may record, remotely from the user, an audio file for attachment to the electronic message. In one embodiment, operation 212 may include an audio file recorded during an audio communication session between client device 110 and gateway 112. The audio file and the electronic message may be marked as being associated with each other by an identifier. The audio communication session may be initiated automatically by client device 110 based on a request by the user to record an audio file for attachment, or a signal may be sent to gateway 112 to enable gateway 112 to initiate the audio communication session.

At an operation 214, the electronic massage may be flagged. This may include attaching a dummy file to the electronic message. The dummy file may be marked as a dummy file by, for example, a file name, a file format, or otherwise marked. The dummy file may represent the audio file recorded remotely at operation 212. In some embodiments, the dummy file may be attached to the electronic message by dummy attachment module 124 at client device 110.

Method 200 may include an operation 216, at which the electronic message and the attached dummy file may be transmitted to an enterprise server. According to various embodiments of the invention, operation 216 may be performed by transmitting the electronic message and the attached dummy file from client device 110 to enterprise server 114 via wireless network 116.

At an operation 218, the dummy file attached to the electronic message may be replaced with the audio file recorded remotely from the user in operation 214. In some embodiments of the invention, operation 218 may include attachment management module 130 replacing the dummy file attached to the electronic message based on a detection of the dummy file by enterprise server extension module 118.

Method 200 may include an operation 220, at which the electronic message and the attached audio file may be transmitted to a mail server. According to various embodiments of the invention, operation 220 may include transmitting the electronic message and the attached audio file from enterprise server 114 to mail server 120, where they may be forwarded to an intended recipient.

Figure 3:
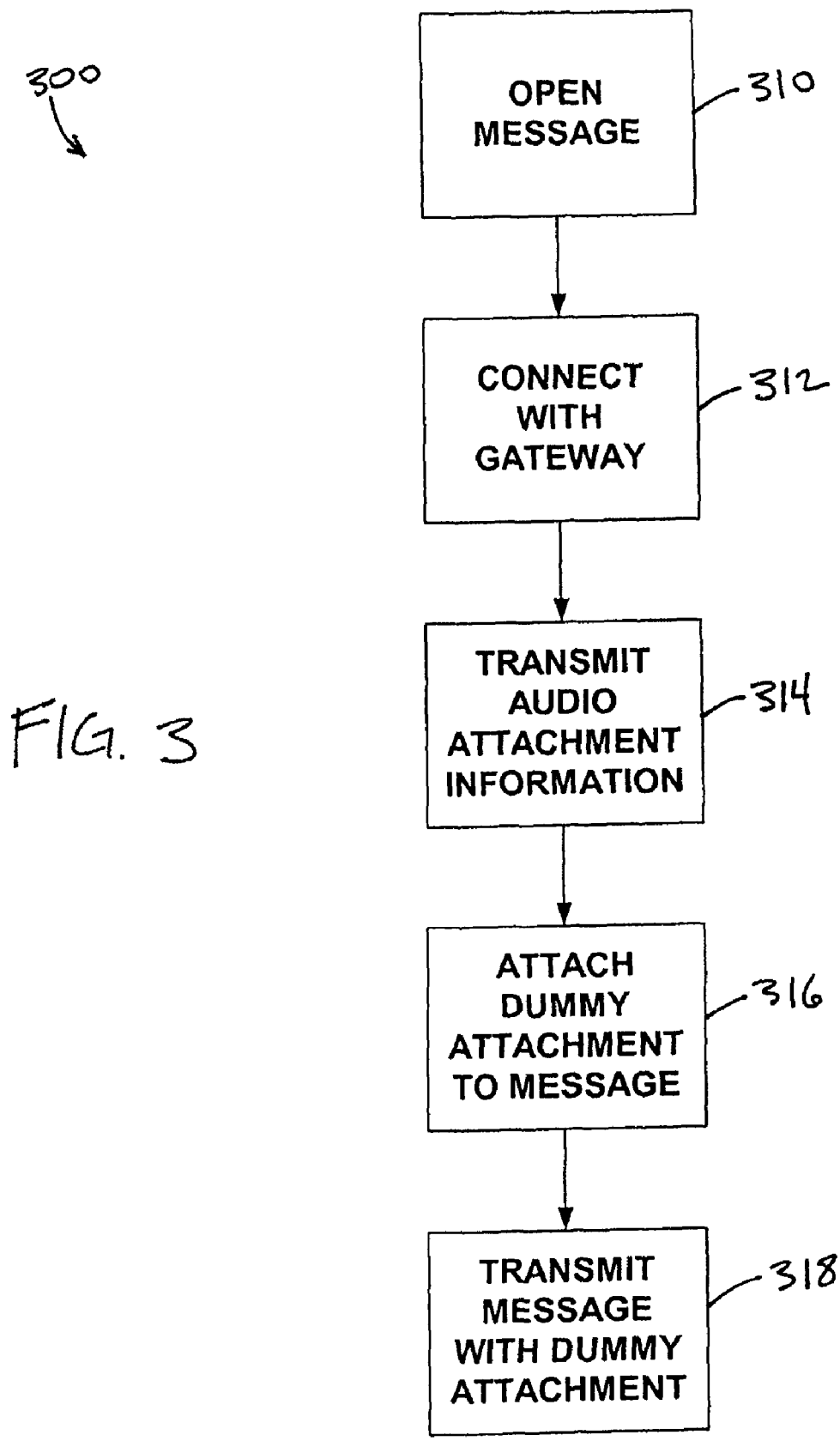
FIG. 3 illustrates a flowchart describing a method for implementing various embodiments of the invention.

FIG. 3 illustrates a method 300 for implementing various embodiments of the invention. In some embodiments, the operations of method 300 may be performed by client device 110 to enable a user to record an audio file for attachment to an electronic message.

At an operation 310, a user may open an electronic message. In some embodiments, operation 310 may include the user opening an electronic message on client device 110 via message management module 122. The message may include, for example, a new message, a reply message, a message to be forwarded, or other messages.

Method 300 includes an operation 312, at which a connection may be established with a gateway. According to various embodiments of the invention, operation 312 may include establishing a connection between client device 110 and gateway 112. The connection may be established based on a request by the user on client device 110 to record an audio file for attachment to the electronic message, and may include an audio communications session between client device 110 and gateway 112.

At an operation 314, audio attachment information may be transmitted to the gateway. For example, the audio attachment information may include audio content for recording, an identifier associated with the electronic message, or other information. In some embodiments of the invention, the audio attachment information may be transmitted from client device 110 to gateway 112 during an audio communications session.

Method 300 may include an operation 316, at which a dummy file may be attached to the electronic message. In some embodiments of the invention, the dummy file may be attached to the electronic message by dummy attachment module 124 of client device 110 at the conclusion of an audio communications session between client device 110 and gateway 112 for recording an audio file for attachment to the electronic message. The attachment of the dummy message may signify to the user that an audio file for attachment to the electronic message has been recorded.

At an operation 318, the electronic message and the attached dummy file may be transmitted. For example, the electronic message and the attached dummy file may be transmitted to an enterprise server. In some embodiments, operation 318 may include transmitting the electronic message and the attached dummy file from client device 110 to enterprise server 114 via wireless network 116.

Figure 4:
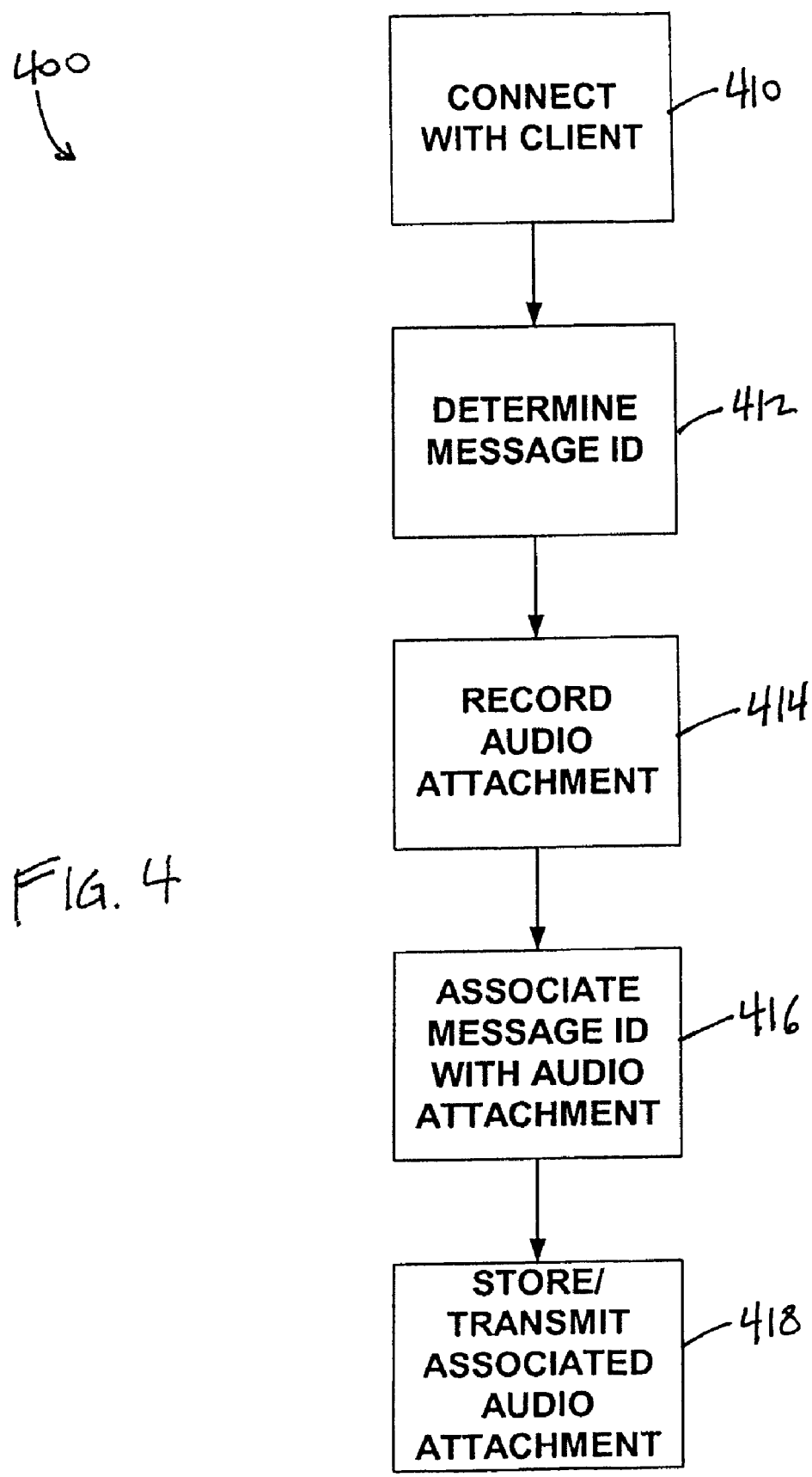
FIG. 4 illustrates a flowchart describing a method for implementing various embodiments of the invention.

FIG. 4 illustrates a method 400 for implementing various embodiments of the invention. In some embodiments, the operations of method 400 may be performed by gateway 112 to record an audio file for attachment to an electronic message.

At an operation 410, a connection may be established with a client device. According to various embodiments of the invention, operation 410 may include establishing a connection between gateway 112 and client device 110. The connection may be established based on a request by the user on client device 110 to record the audio file for attachment to the electronic message, and may include an audio communications session between client device 110 and gateway 112.

At an operation 412, an identifier associated with the electronic message may be determined. According to various embodiments of the invention, operation 412 may include a determination of the identifier associated with the electronic message based on audio attachment information transmitted from client device 110 to gateway 112.

Method 400 may include an operation 414, at which the audio file may be recorded. It will be appreciated that although operation 414 is illustrated as following operation 412, the audio file may be recorded prior to a determination of the identifier. In some embodiments of the invention, operation 414 may include gateway 112 recording the audio file based on audio content received from client device 110.

At an operation 416, the identifier is associated with the audio file. According to various embodiments, operation may include gateway 112 marking the audio file with the identifier. For example, the audio file may be given a file name that corresponds to the identifier.

Method 400 may include an operation 418, at which the audio file may be stored or transmitted. In some embodiments, operation 418 may include gateway 112 transmitting the audio file for storage remote from gateway 112 (e.g., at enterprise server 114 or a remote storage module). In other embodiments, operation 418 may include storing the audio file at gateway 112 until the audio file is requested by enterprise server 114.

FIG. 5 illustrates a method 500 for illustrating various embodiments of the invention. In some embodiments, the operations of method 500 may be performed by enterprise server 112, attachment management module 130, and enterprise server extension module 118 to attach an audio file recorded remotely from the user to an electronic message with a dummy file attached that may be transmitted from the user.

At an operation 510, incoming electronic messages may be monitored for dummy files. According to various embodiments, operation 510 may include enterprise server extension module 118 monitoring incoming electronic message received at enterprise server 114.

Method 500 may include an operation 512, at which the electronic message with the dummy file attached is detected. In some embodiments, operation 512 may include enterprise server extension module 118 detecting the electronic message with the dummy file attached as it is received at enterprise server 114.

At an operation 514, the dummy attachment may be replaced by the audio file. According to various embodiments, operation 514 may include attachment management module 130 of enterprise server 114 replacing the dummy file with the audio file.

Method 500 may include an operation 516, at which the electronic message and the attached audio file may be forwarded to a mail server. In some embodiments, operation 516 may include forwarding the electronic message and the attached audio file from attachment management module 130 to enterprise server 114, which then may forward the electronic message and attachment to mail server 1118. In other embodiments, the electronic message and the attached audio file may be forwarded from the attachment management module 130 to mail server 118 without being returned to enterprise server 114.

Other embodiments, uses and advantages of the invention will be apparent to those skilled in the art from consideration of the specification and practice of the invention disclosed herein.

What is claimed is:

1. A system configured to record and attach an audio file to an electronic message generated by a portable client device, the system comprising:
 a gateway configured to receive audio content from the portable client device, to record the received audio content as the audio file, and to associate an identifier with the audio file;

a server configured to receive the electronic messages generated by the portable client device including an electronic message indicating an intended recipient and having a dummy file attached thereto that represents the audio file, wherein the electronic message including the dummy file further indicates an association with the identifier that is also associated with the audio file;

a server extension module in communication with the server configured to detect electronic messages received by the server from the portable client device having dummy files attached, wherein the server extension module is configured to detect such electronic messages prior to the electronic messages being forwarded to message recipients; and an attachment management module configured (i) to request from the gateway, responsive to detection by the server extension module of the electronic message having the dummy file attached thereto, the audio file associated with the identifier indicated in the detected electronic message as also being associated with the detected electronic message, (ii) to receive the audio file associated with the identifier in response to the request to the gateway, and (iii) to replace the dummy file with the received audio file in response to the reception of the audio file associated with the identifier, wherein the attachment management module is configured to request the audio file, receive the audio file, and replace the dummy file with the audio file prior to the electronic message being forwarded to the intended recipient.

2. The system of claim 1, wherein the gateway comprises an audio recording module that enables a user to perform one or more of the following actions:

re-record the audio file, replay the audio file, or edit the audio.

3. The system of claim 1, wherein the attachment management module is associated with the gateway.

4. The system of claim 1, wherein the attachment management module is associated with the server.

5. The system of claim 1, wherein the server is an enterprise server.

6. The system of claim 1, wherein, subsequent to the replacement of the dummy file with the audio file by the attachment management module, the server is configured to forward the electronic message and the attached audio file to the intended recipient.

7. A portable client device that enables audio content to be attached to an electronic message generated by the portable client device, the portable client device comprising:

a message management module configured to open an electronic message in response to reception at the portable client device of a command from a user to open the electronic message;

an audio communications module configured to place the user in communication with the gateway to provide audio content to the gateway which records the audio content in an audio file, wherein the audio communication module is further configured to provide an identifier associated with the audio file to the gateway; and a dummy attachment module configured to create a dummy file that represents the audio file and to attach the dummy file to the electronic message;

wherein the portable client device is configured to deliver the electronic message and the attached dummy file to a server such that the electronic message indicates an association with the identifier that is also associated with the audio file.

8. The portable client device of claim 7, wherein the identifier identifies the portable client device the portable client device.

9. The portable client device of claim 7, wherein the audio communications module comprises a microphone and a speaker.

10. The portable client device of claim 7, wherein the message management module is configured to enable the user to edit the electronic message.

11. The portable client device of claim 7, wherein the message management module is configured to enable the user to initiate delivery of the electronic message and the attached dummy file to the server.

12. The portable client device of claim 7, wherein the electronic message comprises one or more of a reply to another electronic message, a new electronic message, or a forwarded electronic message.

13. A method for recording and attaching an audio file to an electronic message generated by a portable client device, the method comprising:

opening an electronic message;

recording audio content into an audio file remotely from the portable client device;

flagging the electronic message;

transmitting the flagged electronic message from the portable client device to the server en route to an intended recipient;

detecting the flagged electronic message subsequent to reception at the server but prior to the flagged electronic message being transmitted to the intended recipient;

responsive to detection of the flagged electronic message, attaching the audio file to the flagged electronic message remotely from the portable client device such that the audio file is attached to the flagged electronic message prior to the flagged electronic message being transmitted to the intended recipient; and transmitting the electronic message with the audio file attached thereto to the intended recipient.

14. The method of claim 13, wherein flagging the electronic message comprises attaching a dummy file to the electronic message, the dummy file representing the audio file.

15. The method of claim 14, wherein attaching the audio file to the flagged electronic message comprises replacing the dummy file with the audio file.

16. The method of claim 13, further comprising providing an identifier to be associated with the audio file.

17. The method of claim 16, further comprising:

identifying the flagged electronic message with an identifier subsequent to the transmission of the flagged electronic message from the portable client device to the server;

associating the audio file with the identifier; and attaching audio file to the electronic message based on the audio file and the flagged electronic message being associated with the same identifier.

18. The method of claim 13, further comprising enabling the user to perform one or more of the following actions: editing the audio content in the audio file, replaying the audio content in the audio file, or re-recording the audio content in the audio file.

* * * * *